Aug. 7, 1945.  C. R. HANNA  2,381,160
STABILIZING AND POSITIONING APPARATUS
Filed Nov. 23, 1940  3 Sheets-Sheet 3
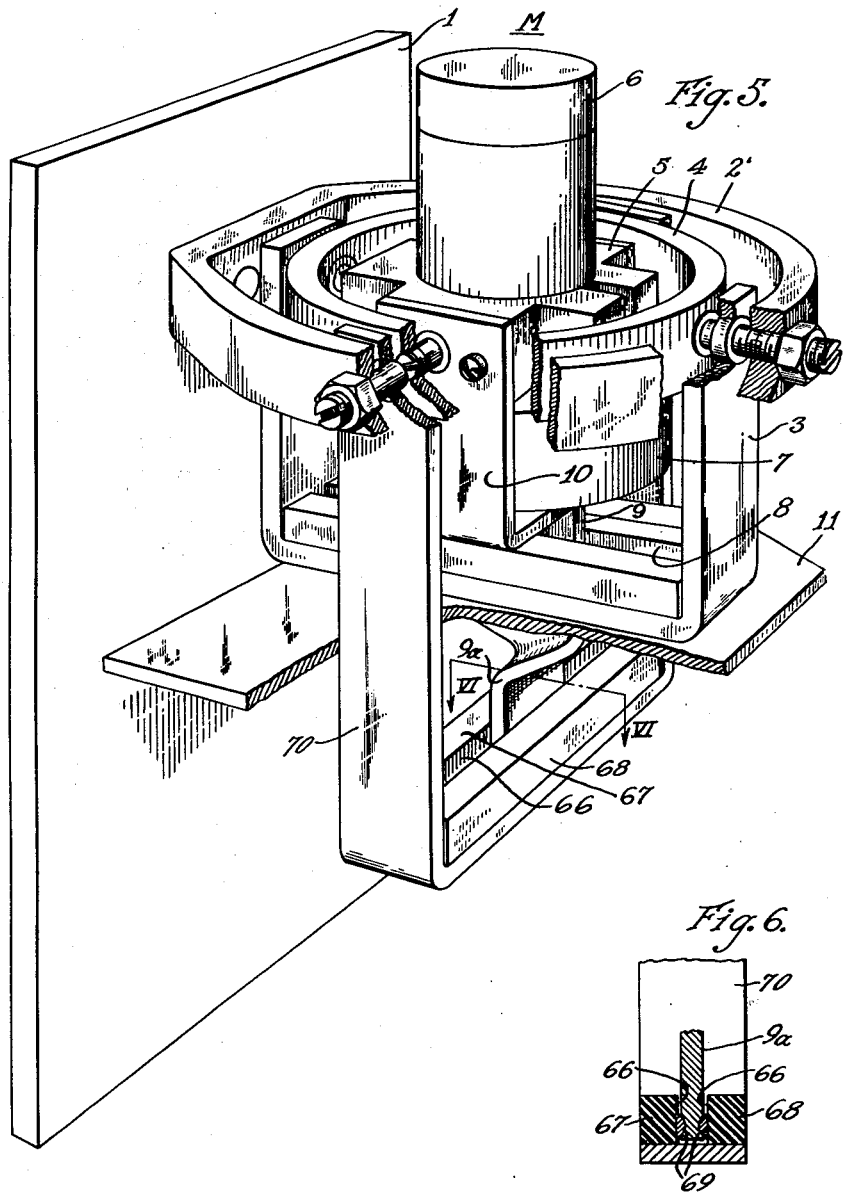
WITNESSES:
E. F. Oberheim.
Wm. J. Ruano
INVENTOR
Clinton R. Hanna.
BY
Paul E. Friedemann
ATTORNEY Patented Aug. 7, 1945

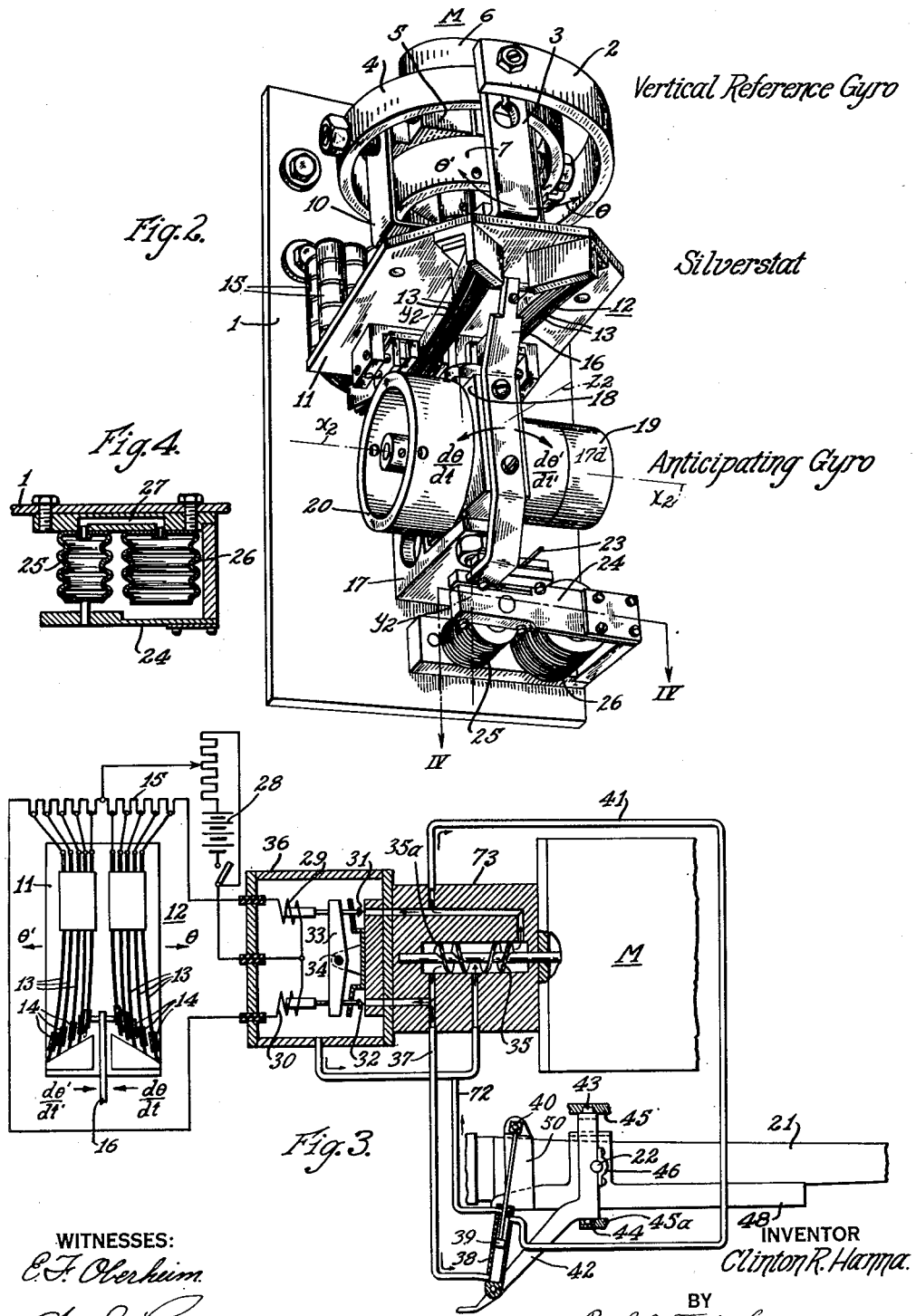

2,381,160

UNITED STATES PATENT OFFICE 2,381,160

STABILIZING AND POSITIONING APPARATUS

Clinton R. Hanna, Pittsburgh, Pa., assignor to Westinghouse Electric Corporation, East Pittsburgh, Pa., a corporation of Pennsylvania Application November 23, 1940, Serial No. 366,877

12 Claims. (Cl. 60—52)

The invention relates to means for controlling the angular position of any suitable element or body with respect to a predetermined axis and it has for an object to provide apparatus of this character which is responsive to change and rate of change of angular position of the element or body to control the position of the latter.

Heretofore, disturbances, due largely to roughness of terrain usually encountered by land vehicles, such as Army tanks, while in motion, have made it practically impossible to keep an element, such as a gun, aimed at a target or object while the vehicle or tank is in motion. The practice was, therefore, followed of stopping the tank for aiming and firing of the gun. The present invention makes it possible to maintain the aim while the tank is in motion with the result that the firing time is increased. This result is achieved by means responsive to deviation or error of gun position to control the gun with a minimum of change in position or position error. More particularly, the gun operates a gyro so that the latter precesses in response to velocity, or rate of change, of error or deviation to control the application of force to the gun to minimize deviation. In addition to the gyro, means responsive to gravity to provide a vertical reference is also used, such reference making it possible for displacement of the gyro relatively thereto to give an effect which is a function of displacement from the wanted position, the displacement effect and the gyro or velocity effect being combined so as to provide a restoring force which opposes departure of the gun from the desired or wanted position, which effects return thereof to that position, and which opposes return as the wanted position is approached to avoid overtravel or hunting. To provide for these operations to the best advantage, the sensitive elements are arranged to cause a pair of parts of a control device to move relatively in response to the characteristics sensed, such relatively moving parts permitting of the effects being used and combined to provide a pair of controlling forces having such relation that a restoring force is applied to the gun and effective thereon in the manner just mentioned. The restoring force must be provided by means permitting of the tank or vehicle to move freely angularly with respect to the mounting axis of the gun. Therefore, the gun is tied or connected by means effective in tension and compression to the supporting structure. This tie or connection is preferably constituted by a relatively movable cylinder and a piston, the piston dividing the interior of the cylinder into a pair of pressure spaces. Pumping means including a pair of pumping units is provided and the units have their outlet spaces connected to the respective pressure spaces so that such units are operative to maintain liquid in the spaces. The pressure in each space is determined by an escape valve movable in an opening direction to decrease the pressure by the force of liquid pressure applied to an area thereof exposed to space pressure. The aforesaid control device is operative to provide a pair of oppositely-varying forces in response to relative movements of the two parts of the device, the controlling forces being applied to the valves in the directions of movement of the latter to oppose the fluid pressure forces acting thereon, with the result that the valves are operated to control the escape of liquid from the conduits so as to maintain pressures in the pressure spaces which are proportionate to the controlling forces. The liquid pressures so provided in the pressure spaces apply proportionate operating forces in opposed relation to the piston to provide a resultant or restoring force applied to the gun. As the pumping units and the valves cooperate to maintain pressures in the pressure spaces with relative displacements of the cylinder and piston, it will be apparent that the tank is free to move angularly with respect to the gun mounting axis without disturbing the angular position of the gun. In effect, the position of the gun is maintained by a piston supported between two liquid pressures which are varied dependent upon gun deviation or error, relative displacement of the piston and cylinder being permitted due to cooperative action of the escape valves and the pumping units with the pressure spaces, liquid from one pumping unit being supplied to the expanding pressure space, with the associated valve controlling the space pressure and permitting of excess liquid to escape and liquid expelled from the contracting pressure space and liquid discharging from the other pumping unit escaping through the valve of the associated conduit with the valve controlling the contracting space pressure.

A further object of the invention is to provide means controlling the angular position of a displaceable body such that angular deviations or displacements will be reduced.

A further object of the invention is to provide position matching mechanism for a pair of bodies capable of relative angular movement so that one body is operated to positionally match the other whether said other is moved or not.

Another object of my invention is to provide an automatic position regulator which is controllable by an "artificial horizon," such as a gyro-vertical.

Another more specific object of my invention is to provide an object finding element such as a gun, a sighting device, a sound detector, or the like, with means for automatically and continuously training or aiming it on a distant object or target at all times, irrespective of fluctuations and disturbances of the supporting structure of such gun or other similar device.

Another specific object of my invention is to provide a gun or similar object mounted on an unstable support with a hydraulic system controllable by electrical means which, in turn, is controllable by a gyro-vertical and by a manually adjustable mechanism, so that the gun will be moved by hydraulic force in response to controlled movements afforded by the adjustable mechanism and gyro-vertical or "artificial horizon."

A further object of the invention is to provide, in connection with a body member pivotally mounted on supporting structure and subject to vibratory disturbing movements about the mounting axis because of disturbances including disturbances due to movements of the supporting structure, a gyro arranged in relation to the body member so that angular velocity of the latter about the mounting axis is accompanied by proportional torque of the gyro about the precession or output axis of the latter together with means responsive to such torque for opposing movements of the body member about the mounting axis in proportion to angular velocity thereof to minimize the amplitude or magnitude of such movements.

Another object of the invention is to provide, in connection with the aforesaid means for opposing motion of the body member about the mounting axis in proportion to angular velocity thereof about the latter, means responsive to gravity to return the body member to a directed position about the mounting axis with respect to the vertical.

Other objects and advantages will become more apparent from a study of the following specification when considered in conjunction with the accompanying drawings, in which:

Fig. 2 is a perspective view of a unit including a gyro-vertical, a contact device, an anticipating gyro, and a bellows;

Fig. 3 is a schematic showing partly in cross-section, and an electrically controlled hydraulic system involving the principles of my invention;

Fig. 4 is a cross-sectional view taken along the line IV—IV of Fig. 2 showing the bellows structure;

Fig. 5 is a perspective view of a modified type of gyro-vertical or "artificial horizon" following the teachings of my invention; and Fig. 6 is a partial view in cross-section taken along line VI—VI of Fig. 5.

Figure 1:
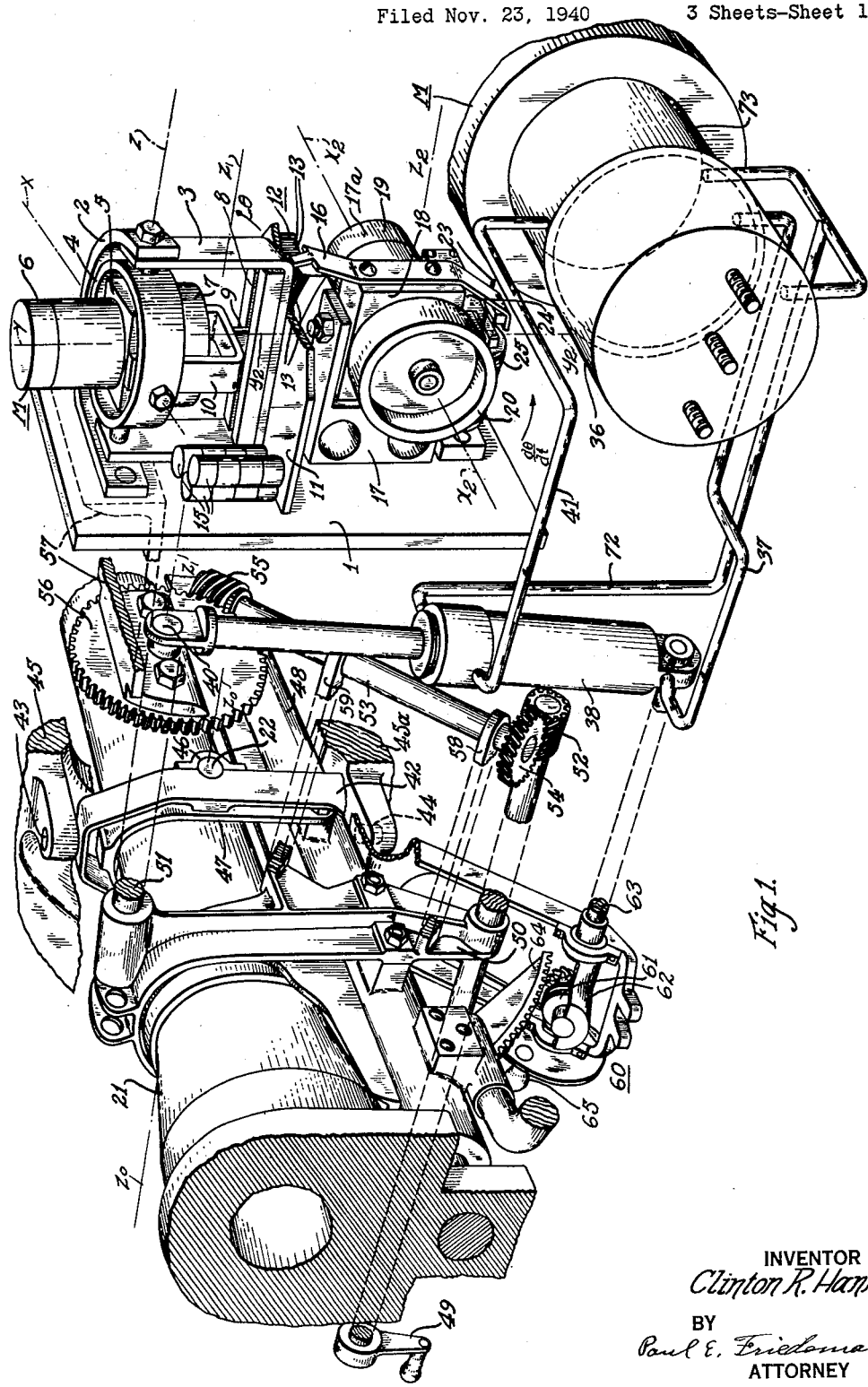
Figure 1 is a perspective view, with certain parts shown partly broken away, of my invention as applied to a gun which is mounted on a tank.

My invention is especially adapted to control the movements of a gun which is pivotally mounted in a tank so that the gun, once aimed at a distant target, will maintain its aim or be continuously trained on such target, irrespective of vibrational or other disturbing movements of the tank in the course of its movement towards the target. It is well known that a tank in the course of its movement will pitch and roll. Pitching movements are angular movements about a horizontal axis at right angles to the direction of travel of the tank while rolling movements are angular movements about an axis parallel to the direction of travel of the tank.

Figure 1 shows a gun mounted on a tank together with means for correcting for pitching disturbances, but which do not correct for rolling disturbances. Such gun is pivotally mounted for movement about only one axis, which permits adjustment only of the elevation of the gun.

To keep a gun or other pivotally-mounted body aimed on a distant object irrespective of disturbances, involves accurate control of its angular position about its pivot axis. Accordingly, there is provided means sensitive to positional error or deviation of the gun or body to limit the extent of such error or deviation; and, to enable this to be done to the best advantage, the means is made sensitive to velocity, or the rate of change, of error or deviation, for the reason that velocity values are large when deviation is small with the result that a strong response is had at the start to bring into play a corresponding opposing or restoring force, which is effective to reduce substantially the error or deviation amplitude as compared to the situation where the error or deviation is unopposed. While the arrangement so far described would be useful to minimize displacements, there would be nothing to prevent drift; and, while the operator might correct for position as may be required, it is much better to perform this function automatically. Therefore, there is provided an angular position reference, for example, a reference vertical, so that the apparatus not only limits deviation, but returns the body to the wanted position fixed by the reference. In other words, the displacement is angular departure from the reference and the apparatus includes means sensitive to such displacement as well as the velocity of displacement with the result that the body has its deviation minimized and is returned to wanted position. If displacement alone were used as a controlling factor, the stabilizing operation would be sluggish and an objectionable amount of hunting of the body member would occur. Therefore, the displacement and velocity effects are combined so as to obtain a strong force to oppose departure and to obtain a force which opposes return of the body to wanted position as such body approaches that position. Response in accordance with velocity is secured by means of a gyro mounted with respect to the body member or gun so as to have precessional movement which is proportional to the angular velocity of the body member or gun about its mounting axis, and displacement response of the body member is had with respect to the reference. These responses may be conveniently combined to obtain the required restoring force by means of a control device including a pair of relatively movable parts, the resultant relative movement of the parts serving to control the restoring force which is of such value and in such timed relation to displacement of the body as to minimize such displacement and return the body to the desired or wanted position without substantial hunting or overtravel. In other words, velocity, that is, the anticipating effect of the gyro, assures of a strong opposing force at the beginning of displacement and before the latter becomes appreciable, the velocity and displacement components of the relative motion of the parts of the control device being added when displacement is increasing; and the gyro provides an anti-hunting effect as the body approaches the wanted position, for, when displacement is decreasing, the velocity component of the relative motion of the parts is subtracted from the displacement component, with the result that the returning force is reduced to zero at some point between maximum displacement and zero displacement and an increasing force opposing return then becomes effective on the body as the latter approaches the wanted position, this force opposing return serving to minimize hunting or overtravel.

While any suitable reference means may be used to assure of return of the body to the desired angular position, where, as illustrated, the invention is applied to stabilize the gun of a tank, a vertical reference is employed for this purpose, such vertical reference being provided by means responsive to gravity to provide a datum plane, and displacement of the body relative to the datum plane defined by the reference, together with precessional movement of the gyro, serve to effect relative movement of the parts of the control device. By way of example, there is shown a reference vertical provided by means of a pendulum stabilized with respect to the vertical by means of a gyro-vertical device which will now be described.

The "artificial horizon" or gyro-vertical device will now be described.

Referring to Figs. 1, 2 and 5, numeral 1 denotes a support which, as will appear more clearly later, is adjustably fixed with respect to the gun, and which is operatively connected to the gun so as to move angularly with the latter. Numeral 2 designates a bracket which is rigidly connected to support 1 and which has pendulously mounted thereon a U-shaped pendulous member 3. In other words, pendulous member 3 is adapted to swing freely about bearings or pivots on the Z axis. It will be readily apparent that if support 1 were to be gradually tilted in its own plane, the pendulous member 3 would tend, at all times, to align itself with the center of the earth due to the gravitational force exerted thereon. However, if such tilting movement of support 1 were violent or if such support were to have a vibratory movement of medium or high frequency, pendulous member 3 would be quite unstable and would tend to oscillate to such an extent that it would no longer be reliable as a reference element. In order to stabilize the pendulous member 3, a gyro-vertical is provided which comprises a gimbal ring 4 pivotally mounted on bracket 2 about the Z-axis and a block 5 which is rigidly clamped about a motor housing 6 and which is pivotally supported by gimbal ring 4 along the X-axis, which is the axis of precession. A motor denoted generally by M, is located within housing 6 and drives a flywheel 7 which constitutes a gyrowheel. The block 5 and the housing 6 constitute the inner frame which carries the spinning body and it is pivotally connected to the outer frame, comprised by the gimbal ring 4, about an axis (X-axis) which is normal to the axis of spin (Y-axis) and such outer frame is pivotally supported about an axis (Z-axis) which is normal both to the axis of spin and the X-axis. As the pendulous member 3 applies torque to the gyro about the outer frame supporting axis, Y-axis, the aggregate consisting of the spinning body and the inner frame precesses about the X-axis. Since such gyrowheel 7 has a vertical axis (or Y-axis) and since the motor housing is pendulously mounted in gimbals, the gyrowheel will inherently and gradually seek a vertical, that is, seek alignment with the earth's center. If there were no friction in the universal gimbal mount, however, the axis of the gyrowheel would oscillate in a conical path indefinitely, once its axis is tilted from the vertical, such as would be effected by rocking movement of the gimbal ring 4 about the Z-axis. This rocking movement, of course, could be caused by sudden stopping, or accelerating movements of the tank, or by movements of the tank while going over rough terrain. Friction at the gimbal bearings or any other resistance to such conical vibration tends to precess the gyrowheel axis back to vertical in a spiral path. Constant friction, however, is highly undesirable because it prevents a complete return of the gyrowheel axis to its normal, earth's center pointing, position. Hence, I provide a frictional damping means in the form of a tongue and groove or slot connection between the gyro housing and the pendulous member and having surfaces adapted for frictional engagement. As illustrated, for example, the connection comprises a track 8 formed by two longitudinal members arranged side by side and having a narrow space therebetween, said members having friction forming sides, either one of which is adapted to frictionally engage a stud 9 which is rigidly secured to block 5 by means of the U-shaped bracket 10. If, for any reason, such as rocking of the support 1 in its own plane with sufficient violence, torque is applied through the gimbal ring 4 about axis Z, to the gyro comprising the motor, its housing, and flywheel 7, such gyro would rock or precess about the X-axis, thereby causing a precessional movement of stud 9 along track 8. The bracket member 10 is pushed or swung sidewise in a sinusoidal manner by the pendulous member 3. The force of the pendulous member 3 against stud 9 is proportional to its deflection from vertical. It will, therefore, be seen that the sliding friction is proportional to this force and is a maximum when the sliding velocity of stud 9 in track 8 is greatest. Therefore, if the gyrowheel axis is at the normal, earth's center pointing position, the friction approaches zero. In other words, with this arrangement, the frictional resistance is proportional to displacements of the pendulous member from the vertical, it becoming less and less as the departure is reduced until it is zero at the vertical position. Consequently, there is no error arising from this type of damping. The damping will be in wholly one plane, the plane defined by axes X and Y. Effective damping of precessional oscillations is secured, for the reason that the damping torque is proportional to precessional velocity. Precessional velocity and spin velocity combine to give a gyroscopic or reaction torque about the Z-axis which is equal and opposed to the applied torque responsible, with spin velocity, for precessional velocity. The reaction torque, or torque arising from gyroscopic action, is applied as a force normal to the engaging friction surfaces; and, since such torque or force is proportional to precessional velocity, the sliding friction will be proportional to precessional velocity as well as to the torque arising therefrom. The sliding friction is, therefore, a force opposing precession; and, as such friction force is effective about the precession axis (X-axis), it will exert a friction torque about the precession axis opposing precession and proportional to precessional velocity. Not only are precessional oscillations effectively damped, but the energy dissipation so involved provides for effective damping of the pendulous member 3 in the plane of swing (plane defined by the axes X and Y) thereof. The gyrowheel axis will spiral inwardly in an unsymmetrical manner, that is, of the form of an elliptical spiral with its larger axis located along the track 8. The dissymmetry is caused in part by the greater pendulousness of member 3 about the Z-axis. Calculations, as well as tests, show that the stability of the gyrowheel axis against disturbing lateral vibratory accelerations is greater about the pendulum axis, that is, the Z-axis, than about the X-axis, that is, is greater in the plane of support 1. Since only one axis of accuracy is desired in the specific application shown in Fig. 1, namely, the Z-axis, the smaller stability about the X-axis has no effect on the performance of the device shown.

As has been hereinbefore explained, pitching movement of the tank may bring about angular movement of the gun and of the support 1 within its plane; and, if torque on that account is applied to the ring 4, it will cause a rocking movement of the motor and gyrowheel about axis X or, in other words, a precessional movement of stud 9 along track 8. The greater the amount of rocking movement of gimbal ring 4, the greater will be the degree of precessional movement of stud 9 along the track 8 and the greater will be the resistive force exerted by the track to tend to return the gyrowheel axis back to its normal vertical position. In other words, relative to the support 1, the pendulous member 3 will move through an angle $\theta$ in the direction indicated by the arrow, which is the angle of displacement and which is representative of the error introduced by movement of support 1. There is provided a contact or control device comprising a pair of relatively movable elements, namely, an actuated element and an actuating element; and the actuated element is carried by a plate 11 at the bottom of the pendulous member 3. The actuated element is comprised by contact leaves indicated generally, at 12. The construction and arrangement of the contacts are more clearly shown in Figs. 2 and 3. They are constituted by self-opening spring leaves 13 having contact members 14, preferably made of silver. The contact leaves are shown arranged in two groups with the contacts of each group connected to spaced taps of a resistor 15, also carried by the plate 11. One method of operation of the contacts is to have a fixed resistance in circuit with one valve operating coil, presently to be described, and a group of contacts with about half of the contacts in the normally closed position and the other half in the normally open position. I prefer, however, to have at least one pair of contacts on each side of the actuating element 16 normally closed, or better still, about half the total number of contacts normally closed, so as to effect opening of such contacts on one side while the other contacts are being closed so as to simultaneously modify the amount of resistance on both the left and right-hand portion of resistor 15. Such "push-pull" arrangement of contacts is a contribution described and claimed in a copending application of L. B. Lynn, Serial No. 366,918, filed November 23, 1940, entitled "Push pull valve control."

Assuming for the moment, that the contact actuating element 16 is rigidly secured with respect to support 1, then, as support 1 tilts clockwise, for example, within its own plane, it will allow the pendulous member 3, together with the contacts carried thereby to move through an angle $\theta$ with respect to the contact actuating element 16; and, hence, would effect a progressive shunting of the left-hand contact members 14.

Of course, upon movement of the contact actuating element 16 in an opposite direction, due to opposite movement of the support, there will be progressive shunting of the right-hand contact members.

I have found that the mere provision of a means responsive to displacement only of disturbing movements is insufficient and unsatisfactory for most purposes, since it is accompanied by sluggishness and since there is a significant amount of hunting which makes the system relatively unstable. In order to overcome this difficulty, I have introduced a second gyroscope, at 17a, which I have termed an anticipating gyro, since it is responsive to the velocity of movement of support 1, that is, to the velocity of the disturbance. Such anticipating gyro performs an anti-hunting function, as will be apparent from the following description. Rigidly mounted on support 1 is a substantially U-shaped bracket 17 which pivotally supports a gyro inner frame 18, which frame includes a block rigidly secured about housing 19 enclosing the second or anticipating gyro motor driving the gyro rotor 20 journaled in the inner frame. Rigidly mounted on the face of block 18 is the contact actuating element 16. As shown in Fig. 1, the outer frame of the gyro, at 17a, is comprised by the support 1 and the yoke 17 and it is pivotally mounted, by means of the shaft 51, about the axis $z_1-z_1$. The inner frame 18 is pivotally supported about the precession or output axis $y_2-y_2$ and the rotor is journaled therein about the spin axis $x_2-x_2$. The spin axis $x_2-x_2$ extends transversely of the mounting axis $z_1-z_1$ and the precession axis $y_2-y_2$ is in normal transverse relation both with respect to the spin axis $x_2-x_2$ and the axis $z_1-z_1$. Further, means is provided for moving the outer frame angularly about the axis $z_1-z_1$ in synchronous relation with the gun or body member as the latter moves about its mounting axis $z_0-z_0$, the arrangement preferably involving connection of the outer frame for angular movement with the gun, with the axes $z_0-z_0$ and $z_1-z_1$ parallel or coincident. Since torque and angular movement about the mounting axis $z_0-z_0$ also occur about the outer frame pivotal mounting axis $z_1-z_1$, precessional effects about the axis $y_2-y_2$ take place.

Since a gyro is not influenced by translatory motion or translatory components of motion, to clarify the gyro operation, input angular motion and torque about the axes $z_0-z_0$ and $z_1-z_1$ may be regarded as acting about the imaginary axis $z_2-z_2$ parallel to $z_1-z_1$ and passing through the point of intersection of the axes $x_2-x_2$ and $y_2-y_2$. Therefore, simplification is secured by considering the mounting axis $z_0-z_0$ as the velocity input axis of the gyro.

As already pointed out, the supporting structure, or tank body structure including the turret, is subject to disturbing movements of a vibratory character, and which movements, mainly because of trunnion friction, result in the application of disturbing forces or torques to the directable element or body member and effective about the mounting or input axis $z_0-z_0$ to produce vibratory disturbing movements thereof about such axis. While such a force or torque about the input axis $z_0-z_0$ results in velocity about the precession or output axis $y_2-y_2$ and consequent gyro torque opposing the applied torque, such opposing torque is practically negligible with the result that the applied force or torque is manifested as an angular velocity about the input axis $z_0$-$z_0$. The fundamental gyrodynamic relation is $T=I_s w_s W$ (in which "T" is torque, "$I_s$" is the moment of inertia of the rotor about the spin axis, "$w_s$" is the angular velocity of spin, and "W" is an angular velocity about an axis at right angles to the spin axis and to the torque axis—precession axis). As operation of a gyro always requires freedom of the rotor to move about a pair of axes at right angles to each other and to the spin axis, torque about one axis of the pair is accompanied by proportional angular velocity about the other axis of the pair and vice versa. Therefore, applying the above equation, angular velocity "W" about the input or mounting axis $z_0$-$z_0$ is accompanied by proportional torque "T" about the precession or output axis $y_2$-$y_2$.

Centering spring means, comprised by the spring contact leaves 13, springiness of the bellows elements 25 and 26, and the spring hinge element 24, provides a scale effect opposing motion about the output or precession axis $y_2$-$y_2$, with the result that the extent of such motion, that is, the precession angle, is a measure of the torque "T" about that axis; and, as such torque is proportional to the disturbing or input angular velocity "W," it follows that the magnitude of spring-opposed precessional movement is proportional to the latter.

As elsewhere herein more particularly described, the precession angle magnitude is transformed, by operation of the leaf spring contacts, into a voltage differential of a pair of electric circuits, the direction and magnitude of the voltage differential depending upon the direction and magnitude of precessional movement; and, by means of a pair of magnetically-operated escape valves for the pair of pressure spaces supplied by pumps, the voltage differential is accompanied by a liquid pressure differential applied as a differential force to the directable element or gun and which differential force is continuously applied and it is varied in opposite directions to oppose vibratory movement of the gun or directable element about the mounting or input axis $z_0$-$z_0$. In other words, the apparatus measures angular velocity of the directable element or body member about the mounting or input axis $z_0$-$z_0$ in terms of a proportional force and such measuring force is amplified and applied to the directable element or body member to oppose vibratory disturbing movements thereof and occurring because of forces or torques applied thereto and due to disturbing movements of the supporting structure upon which the directable element or body member is pivotally mounted, with the result that the disturbing angular movements are greatly reduced in amplitude or magnitude. The apparatus, therefore, functions as a velocity regulator in that it regulates for zero angular velocity, small velocity deviations angularly in opposite directions from the zero angular velocity condition being utilized to minimize the amplitude of disturbing vibratory angular movements.

Assuming a clockwise movement of support 1, it will be apparent that contact actuating element 16 will be moved clockwise about the disturbance axis, namely, the axis about which the gun 21 is pivoted, which axis extends through the trunnion 22. The anticipating gyro is so mounted that its rotor spin axis of gyrowheel 20 will precess about the axis $y_2$-$y_2$ through an angle which is proportional to the velocity of movement of support 1, the feature of the mounting giving proportionality being the centering spring means whose scale effect establishes a proportional relation between the angle of precession and torque about the precession axis, as such torque is proportional to the angular velocity of the outer gyro frame or of the latter and the gun about the mounting axis, it necessarily follows that the angle of precession is proportional to such velocity and therefore serves as the means by which the velocity may be measured in terms of a proportional force. With the angular position of the gun or body member about the mounting axis defined by the gravity-responsive means, any angular error or displacement of the body member from such position involves angular displacement of the support 1. If such error or displacement is represented by $\theta$, then the angle through which the gyro, at 17a, precesses, being proportional to the velocity or rate of change of displacement, which is $$\frac{d\theta}{dt}$$

or W, as hereinbefore referred to, is indicated as a function of velocity by the direction arrows designated $$\frac{d\theta}{dt}$$

and $$\frac{d\theta'}{dt'}$$

in Fig. 2. As hereinbefore pointed out, proportionality of precession angle and angular velocity about the mounting axis is brought about by the scale effect of the centering spring means, with the result that the magnitude of the precession angle measures the torque about the precession axis and therefore the angular velocity about the input axis and which is proportional to the torque. The magnitude of the precession angle in terms of a proportional force is used as input for an amplifier whose output is used to oppose vibratory disturbing angular movements. As velocity always precedes displacement in point of time, velocity tending to be of maximum when displacement is a minimum, and vice versa, with passage of the directable element or gun through equilibrium or mean position, the sense or direction of displacement changes or reverses while the sense of direction of velocity which is then at a maximum, does not change. Therefore, in departing from an equilibrium or mean position, both the velocity sense and the displacement sense are effective, by means of the gyro and the gravity-responsive means, respectively, and in an additive manner, to oppose departure. On the other hand, the velocity sense reverses as displacement passes through a maximum, and, while decreasing displacement of the same sense or direction tends to keep contacts corresponding thereto closed, the reversed velocity sense tends to open such contacts. Therefore, with the displacement having the same sense but decreasing, the effect of velocity is subtracted from that of displacement (the opposite displacement and velocity senses being indicated by the $\theta$, $$\frac{d\theta}{dt}$$

and $\theta'$, $$\frac{d\theta'}{dt}$$

arrows of Fig. 3), resulting in earlier opening of closed contacts, until long before the support or gun has completed the displacement by return to the mean position, the reversed velocity effect overcomes that of displacement and begins closing contacts of the other group with the result that return is opposed by an increasing force resisting over-travel. Thus, velocity is effective to oppose departure from and approach to equilibrium position in consequence of which the magnitude of displacement is minimized. This operation by which motion is opposed in proportion to velocity cooperates with the displacement effect, as sensed by the gravity-responsive means, to provide for anticipating an anti-hunting operation with the return of the support 1 and of the gun or body member to the mean angular position about the mounting axis and in which position the support 1 is restored to vertical by the gravity effect exerted on the contacts with the gyro, at 17a, centered, with the result that, in addition to velocity regulation, position regulation is thereby accomplished.

In order to damp the movements of actuating element 16, a rigid pin 23 is clamped at the bottom end thereof which pin extends to and is connected to a flexible spring-like element 24 rigidly supported on support 1. The left end of such flexible spring-like element 24 is secured to the casing of a small bellows 25, which bellows is in communication with another slightly larger bellows 26 through a duct or passage 27, as shown in Fig. 4. Both bellows are preferably filled with a fluid, such as a liquid, for example, oil, so that movements of actuating element 16 will be damped by alternate expansive and contractive movements of bellows 25 and 26 as fluid is passed from one to the other through passage 27. The spring means constituted by the flexible member 24 and any inherent springiness of the bellows, exerts torque on the anticipating gyro about its precession (Y) axis tending to urge it to mid or central position. The damper also acts, with the spring means, on the anticipating gyro about its precession axis so as to prevent excessive amplitude of oscillation of the gyro at its resonant frequency of precessional oscillation. The impedance or choking effect serving this purpose is due to the passage of fluid to and fro through the passage 27 constituting a restriction between the bellows elements. The damper also functions as a filter to avoid precessional movements of the gyro in response to disturbance frequencies higher than that causing vibratory disturbing angular movements of the gun. For example, with the tank gun, the troublesome disturbance has a frequency of the same order as that encountered in automotive practice, particularly in connection with the design of shock absorbers. With such a troublesome frequency of around 1 or 2 cycles per second, as the damper is designed to filter out all frequencies above 3 or 4 cycles per second, then undesired precessional effects of the gyro may be avoided at frequencies which are higher and which do not bring about the disturbing angular movements of the gun or body member.

Fig. 3 shows in a schematic way the operation of the entire system. A current furnished by battery 28 or other source of energy which is normally equally divided between the right-hand and left-hand portion of resistor 15 since it forms two parallel paths extending, respectively, through actuating coils 29 and 30, will now be divided unequally between the two parallel paths. Two valves 31 and 32 are interconnected by a common valve actuating element 33 pivoted at 34, both valves being normally open because of normal equal energization of coils 29 and 30 which actuates the poppet or seated type valves 31 and 32. The poppet valves 31 and 32, respectively, control the escape or by-pass of liquid from a pair of pressure spaces, the latter being respectively supplied with liquid by the pumps 35 and 35a of pumping means driven by the motor M and diagrammatically represented by a pair of reversely threaded elements. The arrows indicate the pump suction and discharge ports. It is to be understood that pumps of any suitable type may be used so long as the operating requirements of the stabilizer are satisfied. Two separate closed paths are indicated by arrows between each of the pumps and valves 31 and 32, respectively. Tapped on the upper closed path, that is, the one normally going through valve 31, is a pipe line 41 which is connected to the upper space in a cylinder 38, which cylinder is rigidly secured to bracket 42, which, in turn, is rigidly secured by pins 43 and 44 to stationary parts 45 and 45a of the frame of the tank indicated in cross-section. Similarly, tapped on the lower closed path, that is, the one normally extending through valve 32, is a pipe line 37 which connects to the bottom portion of the chamber of cylinder 38. Since the pressure in pipe lines 41 and 37 is equal, they afford equal pressures on opposite sides of the piston. Therefore, they will keep the piston at a predetermined position and, as a consequence thereof, will maintain the gun 21 at a predetermined elevation or angular position. A leakage lead line 72 is connected to the intake pipe and leads directly through the packing through which the piston rod reciprocates and leads directly to such load so that as excessive pressure is developed in the upper part of the piston chamber, excess oil will be able to leak into pipe 72 instead of forcing its way through the packing seal.

From the structure described, it will be apparent that the gun or body member is positioned angularly by means of opposing liquid pressures which are varied in response to the controlling effects or forces furnished from the sensitive elements including the anticipating gyro. Each pressure space of the cylinder has an escape valve, preferably of the poppet type, having an area exposed to pressure in the space so that such pressure exerts force thereon tending to open it. The valves are mechanically interconnected by the actuating element 33 so as to constitute a valve aggregate movable in opposite directions with movement of the valves simultaneously in opposite directions and so arranged that the liquid pressure force applied thereto by one valve is opposed by that applied thereto by the other valve. The aggregate is also subject to a pair of forces acting thereon in opposed relation and under control of the inertia means or gyro and it is, therefore, positioned with the liquid pressure and controlling forces acting thereon in balanced relation. Thus, there is provided a positioning or stabilizing arrangement wherein controlling forces are transformed into proportionate liquid pressures and the liquid pressures are used to effect positioning or stabilization.

The chamber 36 which encloses such valves and electromagnetically operated valve operators may constitute a sump or reservoir or may have attached thereto an additional sump or reservoir (not shown) if so desired.

Assume that the right-hand resistor 15 has been partially shunted by the contact leaves, due to relative movement of actuating element 16 and the flexible contacts as the result of rocking movement of support 1 in the direction indicated by the arrow. It will be seen that more current will flow through coil 29, due to decrease of resistance in series therewith, than through coil 30 which will effect counter-clockwise movement of valve actuating arrangement 33, which will result in movement of the lower valve 32 in a closing direction and movement of the upper valve 31 in an opening direction. As a consequence of this, pump 35a will build up pressure in the pipe line 37 which will cause increase in pressure of liquid at the bottom of cylinder 38 proportionate to the increase in current, which will cause an upward movement of piston 39 therein, which, in turn, will effect an upward push on joint 40 which is secured to the gun 21, causing a clockwise movement of the gun about its trunnion or pivot 22.

If, on the other hand, the displacement were in the opposite direction so that the left-hand instead of the right-hand portion of resistor 15 were shunted, coil 30 would be energized to a greater extent than coil 29, causing movement of the upper valve 31 in a closing direction and building of pressure in the pipe line 41 and in the space above the piston 39 with the result that the piston would be actuated in a downward direction, causing counter-clockwise movement of gun 21 about its pivot or trunnion 22, so as to change the elevation thereof in an opposite sense than previously described.

The outstanding advantage in the use of two separate pumps is that the actuating mechanism for the gun is more quickly responsive to control influences of the progressively opened and closed contacts. Furthermore, by the use of the specific valve arrangement shown, no friction is introduced, such as is common in slide valves.

Fig. 1 shows more clearly the actual construction indicated somewhat schematically in Fig. 3. As will be noted, the housing which encloses the two pumps, namely, housing 73, and the valve chamber 36, are secured together for the sake of providing a compact unit, although it will be readily understood that they may be separated if so desired. Fig. 1 shows more clearly how pins 43 and 44 are rigidly secured to parts of the tank frame, broken sections of which are indicated by numerals 45 and 45a. It will, therefore, be seen that bracket 42, which supports the trunnion 22 of the gun, is rigidly secured to the frame structure of the tank. Bracket 42, together with the bearing member 46, forms a support for the gun 21 and its associated structure so that the gun will be free to move in a vertical plane so as to make its elevation adjustable, but which will restrain movements in a horizontal or lateral plane. With such construction, the operator of the tank is relied upon to drive the tank in the direction of the target at all times so that in such manner, lateral deviations will be compensated for in a degree commensurate with the operator's ability to steer directly towards the target at all times. The gun 21 has an inner bracket 47 secured at the lower end thereof to the recoil chamber 48, which bracket has integrally connected thereto the trunnion 22.

In order to make it possible to adjust the elevation of the gun with a minimum expenditure of manual effort, a handle 49 is provided and which is supported by a bracket 50 rigidly mounted on the recoil chamber 48 and having a portion to which is rigidly mounted a shaft 51. As handle 49 is rotated, it rotates a worm wheel 52, which, in turn, rotates a shaft 53 which has a gear 54 and worm 55 attached to respective ends thereof, and which drives a gear 56 through the worm 55. A substantially Z-shaped bracket 57 rigidly secures gear 56 to support 1. As the supporting element 1 and the means for tilting it are carried by structure movable angularly with the gun, such supporting element may be movable with the gun or connected to move angularly therewith. It will be noted, therefore, that by cranking handle 49, support 1 is turned about the axis of shaft 51. With each increment of turning movement of handle 49, the pendulous member 3 of the upper or vertical gyro will be swung from its normal position, that is, will be swung from the position at which left and right-hand contacts allow insertion of full and equal values of resistance on the left and right-hand portions of resistor 15. However, as the support is moved angularly, displacement thereof is sensed because of the vertical reference and the rate of change, or velocity, of such displacement is sensed by the lower gyro. Therefore, either coil 29 or coil 30 will be energized so as to effect movement in a closing direction of one of the valves 31 or 32 so as to cause either upward or downward motion of the piston 39, which, in turn, will cause clockwise or counter-clockwise movement of the gun 21 in the manner previously described. In other words, the turning of handle 49, which can be done with very little force, since it is connected only to the support 1 and its associated gyro structures, provides a means for controlling the elevating movements of the relatively heavy gun by controlling the pressures on the respective sides of the piston 39. In other words, the hydraulic system serves as a power amplifier for the manual movements of the crank 49. With each increment of turning movement of crank 49 resulting in turning movement of support 1 and of relative movement of the actuating member 16 and the contacts, there will be a hydraulic force developed tending to move the gun in such a direction that it will move the supporting plate 1 in a direction opposite to that in which said plate was turned or tilted, such movement continuing until the plate is restored to its normal angular relation with respect to the datum plane provided by the gravity-responsive means. Since shaft 53 is rigidly supported to the gun by virtue of brackets 58 and 59, and since gear 56 is rigidly connected to the gun by virtue of shaft 51, it will be apparent that as the gun rotates about its trunnion 22, it will carry therewith the entire gear system, including the elements 52—54—55—56.

If it is desired to elevate the gun directly, that is, without resorting to the amplifying force provided by the stabilizer system, the elevation mechanism indicated generally by numeral 60 may be used instead, which elevation mechanism is well known in the art comprising essentially a worm 61 which is mounted in a housing 62 which is swingable about a shaft 63 so that it can be moved into or out of engagement with an arcuate gear segment 64 rigidly attached to the gun. By turning the handle 65, the gun may be elevated through the driving engagement of worm 61 and the gear teeth on the arcuate gear segment 6. This means of elevation is not useable, of course when the stabilizing action is desired.

Fig. 5 shows a modified form of gyro-vertical. In the preceding description of the gyro-vertical, that is, of the gyro which served as a vertical reference, it was pointed out that damping in only one plane was desired and that the gyro structure shown in Fig. 1 was more pendulous in the Y—Z plane, that is, the plane including the track 8, than in the X—Y plane, or the plane at right angles thereto; in other words, the plane of bracket 10, and that the stability of the gyro-vertical axis against disturbing lateral vibrating accelerations was greater about the pendulum axis Z than about axis X. It is desired to have symmetrical performance or symmetrical pendulousness of the U-shaped brackets 10 and 3 so as to adapt the vertical gyro for use in situations where it is desired to compensate not only for pitching movements of the frame structure but for rolling movements as well; then, the structure may be modified in a manner shown in Fig. 5. This figure shows stud 9 as being extended in the form of stud 9A which is twisted at an angle of 90° and is adapted to move along a track 66 which is formed by spaced longitudinal elements 67 and 68, preferably made of friction material such as Micarta or metals. In order to increase the amount of friction developed between the stud portion 9A and the conforming friction surfaces of members 67 and 68, semi-spherical friction material such as metallic pieces 69 (see Fig. 6) are loosely seated in member 9A so as to provide universal movement and form a greater contact surface with stud 9A so as to develop more friction during the movement of contact stud 9A along the track 66. A U-shaped bracket 70 is pivotally mounted on a ring 2' which is stationary and corresponds to the semi-circular ring 2 in Figs. 1 and 2. Member 70 is pivotally supported by ring 2' and supports the members 67 and 68 which form the track 66. If the mass and radius of the U-shaped bracket or pendulum 70 are properly positioned so that the force per unit deviation is the same as that for pendulous member 3, symmetrical performance both as to pendulousness and damping will result. Because of the "two-phase" damping of such an arrangement, circular motion of the stud will be resisted uniformly in a tangential sense.

Irrespective of said one pendulum only, such as 3 in Fig. 1, or where two pendulums (3 and 70) as shown in Fig. 5, are employed, the friction, nevertheless, goes to zero when the axis of the vertical gyro returns to its normal vertical position. Calculations and experiments attest to the fact that the damping is, nevertheless, very high. Decrements of over 60% per cycle have been obtained.

While the stabilizing system, involving position and/or velocity control, has been shown and described specifically and is particularly useful in connection with controlling the aim of a gun carried by a traveling land vehicle, such as a tank, it will be obvious that it is useful generally with pivotally-mounted body members subject to disturbing vibratory movements to minimize such movements in magnitude or amplitude and preferably also to return the body member to a desired angular position about the mounting axis and with respect to reference means. The expression "directed position," as used herein, covers not only the position in which the gun, body member or directable element would be maintained with respect to the vertical by the stabilizing apparatus if there were no vibratory disturbances present but also any minor deviations in such position required for operation of the stabilizer under vibratory conditions.

It will be understood that if my invention is used as a reference for automatic pilots for airplanes, the plane itself is regarded as the object, equivalent to the gun just described.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. In apparatus for indicating the vertical, a pendulous member, vibratory supporting means for the pendulous member, and means for stabilizing the pendulous member with respect to the vertical; said stabilizing means comprising a pendulous gyro including a rotor having a vertical spin axis, an inner frame for the rotor, an outer frame, means for pivotally supporting the inner frame from the outer frame about a horizontal axis extending normally in relation to the axis of the pendulous member and to the rotor spin axis, and means for pivotally supporting the outer frame from said supporting means about a horizontal axis normal to the first horizontal axis; and coupling means between the pendulous member and the pendulous gyro, effective about the second horizontal axis, and providing for precessional movement about the first horizontal axis; said coupling means including surfaces which abut for applying torques from the pendulous member to the pendulous gyro about said second horizontal axis and which engage frictionally under normal forces applied in proportion to torques arising from gyroscopic action to provide damping friction torques effective about the first horizontal axis in proportion to precessional velocities producing said gyroscopic action torques.

2. Indicating means for determining the direction of the earth's center comprising, in combination, a support, a bracket mounted thereon having two oppositely-disposed pivotal bearings, a gyroscope having gimbals pivotally mounted on said bracket bearings and including a vertically-disposed gyrowheel and motor for driving the same, a housing for said motor, a stud rigidly secured to said housing, a substantially U-shaped member having its end pivotally mounted on said bracket bearings and having an elongated track having friction surfaces at the sides thereof adapted for cooperation with said stud so as to offer resistance to the precession movement of said stud following a disturbance which tends to rock said support and said gimbals, the axis of said gyrowheel thereby always tending to align itself with the earth's center.

3. In combination, a member movable angularly about an axis; a gyro comprising a rotor, an inner frame carrying the rotor and constituting with the latter a rotor assembly, an outer frame, means for pivotally supporting the inner frame from the outer frame about a first axis normal to the rotor spin axis and for pivotally supporting the outer frame about a second axis normal to the rotor spin axis and to the first axis and with the second axis coincident with the movable member axis, and means providing bias effective on the rotor assembly and tending to move the latter with respect to the first axis to an equilibrium position; a coupling including coupling elements connected to said member and to said inner frame and having surfaces formed to provide for precessional movements of said assembly about said first axis and which are engageable due to gyroscopic action to develop friction torques effective about the first axis in proportion to precessional velocities responsible for gyroscopic action to damp precessional oscillations.

4. In combination, with a directable element pivotally mounted on supporting structure about a substantially horizontal axis and subject to disturbing angular movements about the mounting axis because of disturbances including disturbances due to movements of the supporting structure, apparatus for automatically maintaining said directable element in a directed position about the mounting axis relative to the vertical irrespective of said disturbances and said apparatus comprising motor means including a pair of relatively movable members connecting the supporting structure and the directable element and operable to apply forces to the latter to oppose motion thereof about the mounting axis, to move the directable element about the mounting axis, and to provide for angular movement of the supporting structure about the mounting axis and relative to the directable element; a gyro including an outer frame movable angularly with the directable element as the latter moves angularly about the mounting axis, an inner frame pivotally supported by the outer frame about a precession axis, a rotor journaled in the inner frame, and spring means for centering the inner frame about the precession axis; the gyro rotor spin axis extending transversely of the mounting axis and the precession axis extending transversely of both the mounting axis and the spin axis so that angular velocity of the directable element about the mounting axis is accompanied by proportional torque of the inner frame and rotor about the precession axis; variable means responsive to movement of the inner frame about the precession axis to render the motor means effective to apply force to the directable element opposing motion thereof about the mounting axis in response to velocity of such motion; and means which seeks an equilibrium position in response to gravity and with respect to which the directable element is movable to operate the variable means to control the motor means to maintain the directable element in directed position about the mounting axis with respect to the vertical.

5. Apparatus as claimed in claim 4 with a damper acting on the inner frame of the gyro about the precession axis to avoid gyro operation in response to disturbances of frequencies higher than that responsible for disturbing movements of the directable element.

6. Apparatus as claimed in claim 4 with a damper acting on the inner frame of the gyro about the precession axis to avoid gyro operation in response to disturbances of frequencies higher than that responsible for disturbing movements of the directable element and wherein the damper is comprised by means providing for flow of liquid to and fro through a restricted passage as the inner frame moves about the precession axis.

7. In combination, with a directable element supported by and pivotally mounted on supporting structure about a substantially horizontal axis and subject to disturbing angular movements about the mounting axis because of disturbances including disturbances due to movements of the supporting structure, apparatus for automatically maintaining said directable element in directed position about the mounting axis relative to the vertical irrespective of said disturbances and said apparatus comprising motor means including a pair of relativeley movable members connecting the supporting structure and the directable element and operable to apply forces to the latter to oppose motion thereof about the mounting axis, to move the directable element about the mounting axis, and to provide for angular movement of the supporting structure about the mounting axis and relative to the directable element; a gyro including an outer frame structure pivotally mounted about an axis parallel to or coincident with the mounting axis and normally movable angularly with the directable element as the latter moves angularly about the mounting axis, an inner frame pivotally supported by the outer frame structure about a precession axis, a rotor journaled in the inner frame, and spring means for centering the inner frame about the precession axis; the gyro rotor spin axis extending transversely of the mounting axis and the precession axis extending transversely of both the mounting axis and the spin axis so that angular velocity of the directable element about the mounting axis is accompanied by proportional torque of the inner frame and rotor about the precession axis; variable means responsive to movement of the inner frame about the precession axis to render the motor means effective to apply force to the directable element opposing motion thereof about the mounting axis in response to the velocity of such motion; means including a mass pivotally carried by said outer frame structure and urged by gravity to an equilibrium position with respect to which the outer frame structure is movable due to angular movement of the directable element about the mounting axis to operate the variable means to control the motor means to maintain the directable element in directed position about the mounting axis with respect to the vertical with the outer frame structure in a predetermined angular position about its pivot axis with respect to the vertical; and a member manually rotatable to apply angular motion to the outer frame structure to render the gyro and the gravity-responsive means effective to operate the variable means to control the motor means to move the body member in a follow-up manner in relation to angular movement of the manually-rotatable member.

8. In combination, with a directable element pivotally mounted on supporting structure about a substantially horizontal axis and subject to disturbing angular movements about the mounting axis because of disturbances including disturbances due to movements of the supporting structure, apparatus for automatically maintaining the directable element in directed position about the mounting axis relative to the vertical irrespective of said disturbances and said apparatus comprising motor means including a pair of relatively movable members connecting the supporting structure and the directable element and operable to apply forces to the latter to oppose motion thereof about the mounting axis, to move the directable element about the mounting axis, and to provide for angular movement of the supporting structure about the mounting axis relative to the directable element; a gyro including an outer frame movable angularly with the directable element as the latter moves angularly about the mounting axis, an inner frame pivotally supported by the outer frame about a precession axis, a rotor journaled in the inner frame, and spring means for centering the inner frame about the precession axis; the gyro rotor spin axis extending transversely of the mounting axis and the precession axis extending transversely of both the mounting axis and the spin axis so that angular velocity of the body member about the mounting axis is accompanied by proportional torque of the inner frame and rotor about the precession axis; variable means responsive to movement of the inner frame about the precession axis to render the motor means effective to apply force to the directable element opposing motion thereof about the mounting axis in response to the velocity of such motion; and means which seeks an equilibrium position, in response to gravity and with respect to which the directable element is movable to operate the variable means to control the motor means to maintain the directable element in directed position about the mounting axis with respect to the vertical; said last-named means including a pendulous member pivotally supported about an axis parallel to the mounting axis and means for stabilizing the pendulous member with respect to the vertical; said stabilizing means including a pendulous gyro and a coupling between the pendulous member and the pendulous gyro; said pendulous gyro comprising a rotor having a normally vertical spin axis, an inner frame in which the rotor is journaled, a gimbal ring pivotally supporting the inner frame about a first axis at right angles to the rotor spin axis and pivotally supported about a second axis coincident with the pendulous member supporting axis and at right angles to the first axis; and said coupling including coupling elements connected to the inner frame of the pendulous gyro and to the pendulous member and having surfaces arranged to provide for precessional movements of such inner frame and the rotor carried thereby about said first axis and which surfaces are engageable due to gyroscopic action to develop friction torques effective about said first axis in proportion to precessional velocities responsible for gyroscopic action to damp precessional oscillations.

9. In combination, with a directable element pivotally mounted on supporting structure about a substantially horizontal axis and subject to disturbing angular movements about the mounting axis because of disturbances including disturbances due to movements of the supporting structure, apparatus for automatically maintaining the directable element in a directed position about the mounting axis relative to the vertical irrespective of said disturbances and said apparatus comprising motor means including relatively movable piston and cylinder members connecting the directable element and the supporting structure; said cylinder member cooperating with the piston member to provide cylinder spaces at opposite sides of the piston; means providing a pair of spaces in open communication with the cylinder spaces; means for maintaining liquid under pressure in said spaces and including an escape valve for each space of said pair and each valve having an area exposed to liquid pressure of its space so that the force of such pressure acting on the valve tends to move it in an opening direction to reduce space pressure; means for mechanically connecting the valves so that opening force applied to one valve is opposed by that applied to the other valve; a gyro including an outer frame movable angularly with the directable element as the latter moves angularly about the mounting axis, an inner frame pivotally supported from the outer frame about a precession axis, a rotor journaled in the inner frame, and spring means for centering the inner frame about the precession axis; the gyro rotor spin axis extending transversely of the mounting axis and the precession axis extending transversely of both the mounting and the spin axis so that angular velocity of the directable element about the mounting axis is accompanied by proportional torque about the precession axis; a pair of magnets having windings for applying magnetic forces to the mechanically-connected valves; a pair of electric circuits for the magnet windings; means for varying the voltages of the circuits including self-opening leaf spring contacts and an actuator movable relative thereto to engage and disengage contacts to vary the circuit voltages differentially to vary differentially the magnetic forces applied to the valves in order to vary the space pressures differentially for development of force applied by the motor means to the directable element; means responsive to motion of the inner frame about the precession axis to effect relative movement of the actuator and the contacts to render the motor means effective to apply force to the directable element opposing motion thereof about the mounting axis in response to the velocity of such motion; and means which seeks an equilibrium position in response to gravity and with respect to which the directable element is movable to effect relative movement of the actuator and the groups of contacts to vary the circuit voltages for operation of the motor means to apply force to the directable element to maintain the latter in directed position about the mounting axis with respect to the vertical.

10. In combination, a body member pivotally mounted on supporting structure about a substantially horizontal axis and subject to disturbing angular movements about such axis because of movements of the supporting structure, a motor mounted on the supporting structure for driving the body member about the mounting axis, and means for controlling the motor to minimize angular movements of the body member about the mounting axis and to position the body member angularly about the mounting axis with respect to the vertical: said means comprising a gyro including an inner frame, a rotor journaled in the inner frame, and an outer frame pivotally supporting the inner frame about a precession or output axis transverse to the rotor spin axis; means for mounting the outer frame for angular movement with the body member as the latter moves about the mounting axis with the axis of angular movement of the outer frame extending transversely of the precession or output and spin axes to constitute the input axis of the gyro so that angular velocity of the body member about the mounting axis is accompanied by proportional torque of the gyro about the precession or output axis; variable means responsive to torque of the gyro about the precession or output axis to control the motor to oppose angular movement of the body member about the mounting axis in response to the velocity of such movement, and a mass pivotally carried by the outer frame and urged by gravity to an equilibrium position with respect to which the outer frame is movable due to angular movement of the body member about the mounting axis to operate the variable means to control the motor to position the body member angularly about the mounting axis with respect to the vertical with the outer frame in a predetermined position about its axis of angular movement with respect to the vertical.

11. In combination, with a body member pivotally mounted on supporting structure about a substantially horizontal axis and subject to disturbing angular movements about the mounting axis because of disturbances including disturbances due to movements of the supporting structure, means for minimizing said disturbing movements of the body member and for maintaining the direction of the body member angularly about the mounting axis with respect to the vertical, said means comprising a motor including a pair of relatively movable members connecting the supporting structure and the body member and operative to apply force to the body member opposing motion of the latter about the mounting axis, to maintain the body member in directed position about the mounting axis, and to provide for angular movement of the supporting structure about the mounting axis and relative to the body member; said motor including a pair of voltage-responsive elements operative to control the magnitude and direction of force applied thereby to the body member; a pair of circuits for the voltage-responsive devices; means for varying the voltages of the circuits including an actuator movable from mid-position in opposite directions to vary the voltages in the circuits differentially in opposite directions for operation of the voltage-responsive elements to control the magnitude and direction of force applied by the motor means to the body member; a gyro including an outer frame movable angularly with the body member as the latter moves about the mounting axis, an inner frame pivotally supported from the outer frame about a precession axis, and a rotor journaled in the inner frame; the gyro rotor spin axis extending transversely of the mounting axis and the precession axis extending transversely of both the mounting axis and the spin axis so that angular velocity of the body member about the mounting axis is accompanied by proportional torque of the rotor and the inner frame about the precession axis; means for connecting said actuator for movement with the inner frame as the latter moves about the precession axis so that torque of the gyro about the latter is effective to operate the voltage-varying means for control of the motor means to apply force to the body member to oppose motion of the latter about the mounting axis in response to the velocity of such motion, and a mass pivotally carried by the outer frame and urged by gravity to an equilibrium position with respect to which the outer frame is movable due to angular movement of the body member about the mounting axis to operate the voltage-varying means to control the motor for maintenance of the direction of the body member angularly about the mounting axis with respect to the vertical with the outer frame in a predetermined position about its axis of angular movement with respect to the vertical.

12. In combination, with a body member pivotally mounted on supporting structure about a substantially horizontal axis and subject to disturbing angular movements about the mounting axis because of disturbances including disturbances due to movements of the supporting structure, means for minimizing said disturbing movements of the body member and for maintaining the direction of the latter angularly about the mounting axis with respect to the vertical, said means comprising a motor including relatively movable piston and cylinder members connecting the body member and the supporting structure; said cylinder member cooperating with the piston member to provide cylinder spaces at opposite sides of the piston; means providing a pair of spaces in open communication with the cylinder spaces; means for maintaining liquid under pressure in said spaces and including an escape valve for each space of said pair and each valve having an area exposed to liquid pressure of its space so that the force of such pressure acting on the valve tends to move it in an opening direction to reduce the space pressure; means for mechanically connecting the valves so that opening force applied to one valve is opposed by that applied to the other valve; a gyro including an outer frame movable angularly with the body member as the latter moves angularly about the mounting axis, an inner frame pivotally supported from the outer frame about a precession axis, and a rotor journaled in the inner frame; the gyro rotor spin axis extending transversely of the mounting axis and the precession axis extending transversely of both the mounting axis and the spin axis so that angular velocity of the body member about the mounting axis is accompanied by a proportional torque of the inner frame about the precession axis; variable means including actuating and actuated elements movable relatively in opposite directions to provide a pair of controlling forces which vary differentially in opposite directions and which are applied to the mechanically-connected valves to operate the latter to provide liquid pressures in the spaces varying differentially in opposite directions; means for effecting relative movement of the actuating and actuated elements of the variable means in response to torque of the inner frame about the precession axis to vary the controlling effects and consequently the liquid pressures in the spaces for operation of the motor to apply force to the body member opposing angular movement of the latter about the mounting axis in response to the velocity of such movement; and a mass pivotally carried by the outer frame and urged by gravity to an equilibrium position with respect to which the outer frame is movable due to angular movement of the body member about the mounting axis to effect relative movement of the actuating and actuated elements to control the motor to maintain the direction of the body member about the mounting axis with respect to the vertical with the outer frame in a predetermined position about the axis of movement with respect to the vertical.

CLINTON R. HANNA.